United States Patent [19]
Jeong

[11] Patent Number: 4,941,058
[45] Date of Patent: Jul. 10, 1990

[54] DATA SIGNAL RECORDING/REPRODUCTION APPARATUS OF A VCR

[75] Inventor: Dong Kil Jeong, Kyungki-Do, Rep. of Korea

[73] Assignee: Goldstar Co., Ltd., Seoul, Rep. of Korea

[21] Appl. No.: 238,858

[22] Filed: Aug. 31, 1988

[30] Foreign Application Priority Data

Aug. 31, 1987 [KR] Rep. of Korea ............... 14809/1987

[51] Int. Cl.$^5$ ............................................. G11B 5/02
[52] U.S. Cl. ...................................................... 360/67
[58] Field of Search ...................... 360/27, 72.2, 67, 68

[56] References Cited

U.S. PATENT DOCUMENTS 4,384,308  5/1983  Yanagida ............................. 360/27
4,385,327  5/1983  Pare ..................................... 360/27

Primary Examiner—Vincent P. Canney

[57] ABSTRACT

An apparatus for recording and reproducing a data signal on or from a video track of a video tape includes an audio control head composed of an audio erasing head, an audio recording/reproduction head, a control signal recording/reproduction head, and an auxiliary reproduction head which is adapted to trace a control track of a video tape prior to the control signal recording/reproduction head. The apparatus can record and reproduce a data signal, such as an index signal and an address signal, on or from the control track of not only a new tape in which no video signal has been recorded, but also from an existing tape and which a video signal has been recorded by changing only the recording position of a negative pulse signal when recording the data signal on the control track of the video tape.

1 Claim, 3 Drawing Sheets

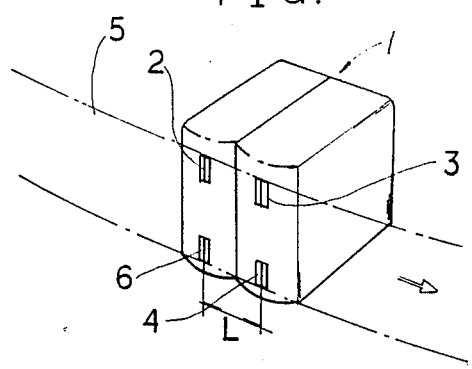
FIG. 1
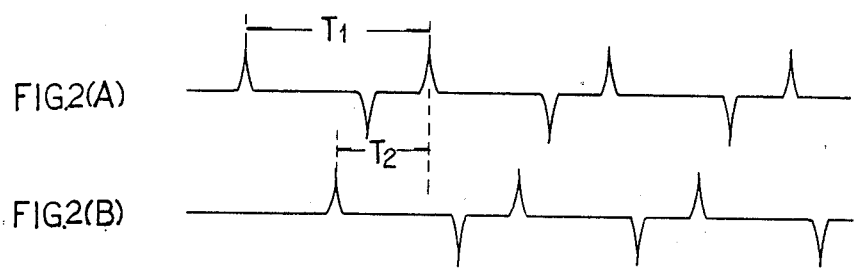
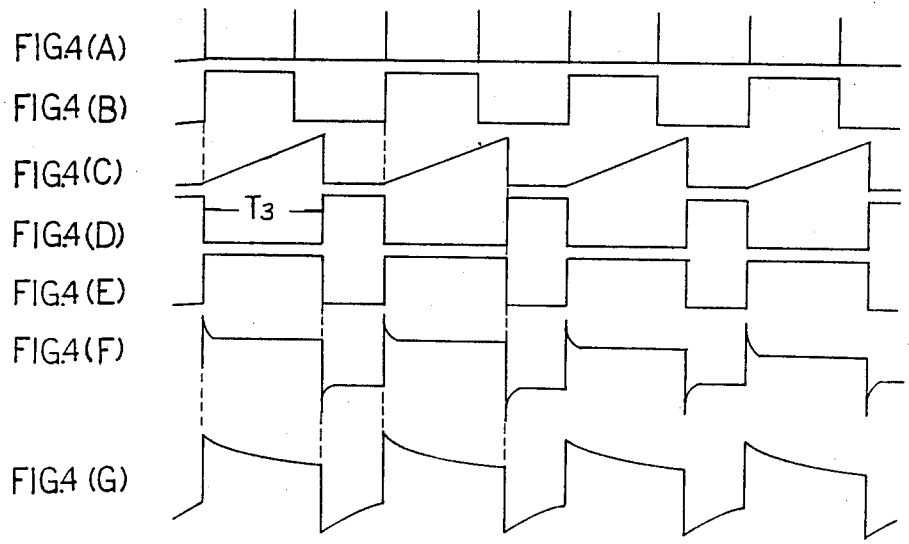

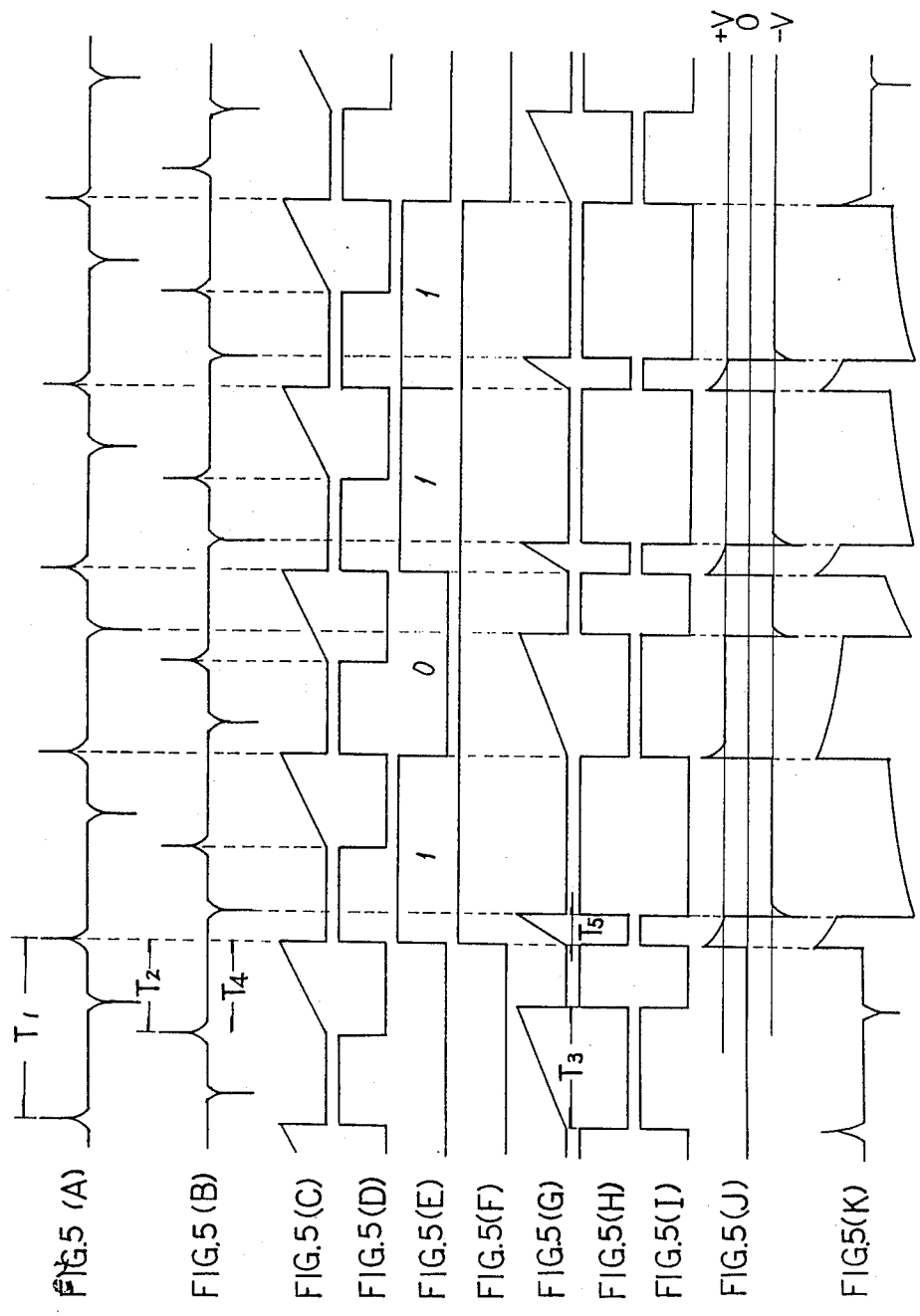

4,941,058

DATA SIGNAL RECORDING/REPRODUCTION APPARATUS OF A VCR

BACKGROUND OF THE INVENTION

The present invention relates to a video cassette recorder (hereinafter, referred to as a VCR) having a VISS (Video Index Search System) and a VASS (Video Address Search System), and more particularly, to a data signal recording/reproduction apparatus in a VCR in which data signals, such as an index signal, an address signal, and the like, are recorded on and reproduced from the control track of a video tape.

There has been generally used an automatic indexing apparatus in which a data signal having a frequency lower than that of a video signal, namely, an index signal, is recorded on the video track of a video tape by using a full-width erasing head in order to designate a record position on a video tape of the recorded video signal and to designate a program. The data signal is then reproduced by a separate detective head.

However, in such a conventional indexing apparatus, an additional detective head is required on the tape running path during reproduction or FF/REW, and only one kind of data signal is recorded on the video tape so that it is difficult to detect precisely each position when several positions are designated. It is also impossible to record and reproduce arbitrary address signals.

There is also another method for recording and reproducing data signals, such as index signal, address signal and the like, in and from a control track of a video tape.

In this method, the positive pulse signal of a control signal, which is necessary to control a motor for rotary head drum, it not voluntarily utilized. Only the negative pulse signal of a control signal, which is unnecessary to control a motor for rotary head drum, is utilized. Between the positive pulse signals, which are recorded at regular intervals, the negative pulse signals are recorded with their positions changing according to a data signal. The data signal is detected by the change in the ratio of the intervals between the positive pulse signal and the negative pulse signal, i.e., a change from a high level or low level of the digital signal at the time of reproduction. The position of program recorded in a video tape is thereby designated.

However, the above method can only be utilized for a new tape in which no video signal has previously been recorded. The method cannot be utilized for an existing video tape in which a video signal is recorded. That is the recording position of a positive pulse signal recorded on the control track of a video tape must not be changed and because it is impossible to change the position of the negative pulse signal without changing the position of the positive pulse signal and; therefore, this method can not be utilized in the existing video tape.

Furthermore, the method has a disadvantage in that an additional circuit for preventing the negative pulse signal from recording within the predetermined area of the front and rear area of the positive pulse signal is required in order to precisely reproduce the positive pulse signal at the time of reproduction, and thereby the structure of the whole circuit becomes complicated.

SUMMARY OF THE INVENTION

Therefore, the object of the present invention is to provide a data signal recording/reproduction apparatus which can record and reproduce a data signal, such as an index signal, an address signal, and the like, on or from a control track of not only a new tape in which no video signal is recorded, but also of an existing video tape in which a video signal is recorded.

The above object of the present invention can be accomplished by changing only the recording position of a negative pulse signal and not changing the recording position of a positive pulse signal at the time of recording a data signal, such as an index signal and an address signal or the control track of a video tape.

BRIEF DESCRIPTION OF THE DRAWINGS

This and other objects, features and advantages of the present invention will become more apparent from the following detailed description in conjunction with the accompanying drawings, in which:

FIG. 1 is a schematic perspective view of a detective head used in the recording/reproduction apparatus according to the present invention;

FIGS. 2(A) and 2(B) are wave form views for explaining the relations of control signals which are reproduced by a control signal recording/reproduction head and an auxiliary reproduction head, respectively according to the present invention;

FIGS. 4(A) to 4(G) are wave form views of each part of FIG. 3 when recording a data signal in a new tape in which no video signal is recorded; and FIGS. 5(A) to 5(K) are wave form views of each part of FIG. 3 when recording to a data signal in a video tape in which a video signal is recorded.

DETAILED DESCRIPTION OF THE INVENTION

Figure 3:
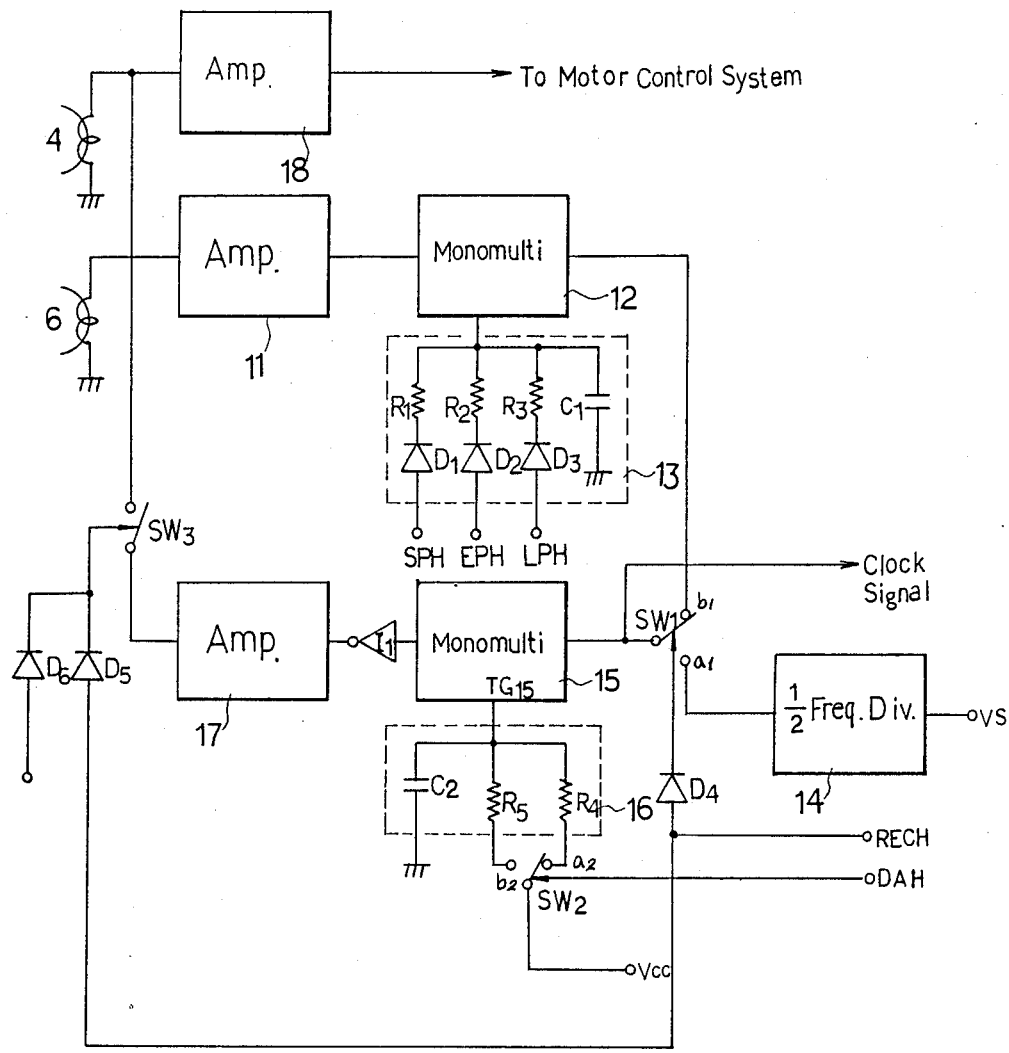
FIG. 3 is a detailed circuit diagram of the data signal recording/reproduction apparatus according to the present invention.

Referring to FIG. 1 a set-up state of an auxiliary reproduction head according to the present invention is shown. As shown in the drawing, on the upper front surface of an audio control head 1, an audio erasing head 2 and an audio recording/reproduction head 3 are mounted with a predetermined interval L, and on the lower side of the audio recording/reproduction head 3, a control signal recording/reproduction head 4 is mounted. On the lower part of the audio erasing head 2, that is, on the front of the control signal recording/reproduction head 4 with respect to the an advancing direction of a video tape 5 as illustrated in arrow, an auxiliary reproduction head 6 is mounted to trace a control track of the video tape 5.

Since the auxiliary reproduction head 6 can trace the control track of the video tape 5 prior to the control signal recording/reproduction head 4, the signal reproduced at the auxiliary reproduction head 6 is earlier than that of the control signal recording/reproduction head 4 in some degree.

Referring now to FIG. 2, when the positive pulse signal of the control signal is reproduced at predetermined time $T_1$ intervals, as shown in FIG. 2(A), the auxiliary reproduction head 6 reproduces positive pulse signals prior to the positive pulse signal reproduced by the control signal recording/reproduction head 4 which is developed by the time $T_2$ as shown in FIG. 2(B).

In the above, the time $T_2$ is related with the interval L, the running speed of the video tape 5 according to an SP (Standard Play) mode, EP (Extended Play) mode or LP (Long Play) mode, it is shorter than the time $T_1$ which is the time interval for generating the positive pulse signal.

FIG. 3 is a detailed circuit diagram of the apparatus of the present invention, as shown in the drawing, the auxiliary reproduction head 6 is connected to an input terminal of a monostable multivibrator 12 (hereinafter, referred to as a multivibrator) through an amplifier 11, To the trigger terminal $TG_{12}$ of the multivibrator 12, a time constant circuit 13 comprises diodes $D_1$–$D_3$, resistors $R_1$–$R_3$ and capacitor $C_1$, with the output terminal thereof connected to a fixed terminal $b_1$ of an electronic switch $SW_1$. To the another fixed terminal $a_1$ of the electronic switch SW, a vertical synchronizing signal input terminal VS is connected through a half($\frac{1}{2}$) frequency divider 14. To the control terminal of the electronic switch $SW_1$, a recording control signal input terminal RECH is connected through a diode $D_4$, and the movable terminal thereof is connected to an input terminal of a monostable multivibrator 15.

Furthermore, a data signal input terminal DAH and a Power source terminal Vcc are connected to a control terminal and a movable terminal of an electronic switch $SW_2$ respectively. The other side of fixed terminals $a_2$ and $b_2$ of the electronic switch $SW_2$ are connected to a capacitor $C_2$ through resistors $R_4$, $R_5$ of a time constant circuit 16, respectively. The connecting point of the capacitor $C_2$ and the fixed terminals $a_2$ and $b_2$ is connected to a trigger terminal $TG_{15}$ of the multivibrator 15, and the output terminal of the multivibrator 15 is connected to the control signal recording/reproduction head 4 through an inverter $I_1$, an amplifier 17 and an electronic switch $SW_3$. At the same time, the connecting point of the electronic switch $SW_3$ is connected to a motor control system. The recording control signal input terminal RECH and data recording control signal input terminal DH are connected to the control terminal of the electronic switch $SW_3$ through diodes $D_5$ and $D_6$, respectively. In the above circuit, the electronic switches $SW_1$ and $SW_2$ are constructed in such a manner that their movable terminals are to be short-circuited with their one side fixed terminals $a_1$ and $a_2$ when a high level signal is applied to their control terminals. On the other hand, the other electronic switch $SW_3$ is constructed in such a manner that it is to be short-circuited when a high level signal is applied to its control signal. The references not described in the drawing SPH, EPH and LPH are respective mode control signal input terminals thereof in which a high level signal is input at the time of SP, EP and LP modes, respectively.

The operations and technical effects of the apparatus will now be described in detail with reference to the wave forms illustrated in FIG. 4 and FIG. 5.

When power is applied to a power source terminal Vcc and a video signal is recorded, a vertical synchronizing signal as shown in FIG. 4(A) is inputted to a vertical synchronizing signal inputted terminal VS, and a high level signal is input to a recording control signal input terminal RECH. The terminal of the electronic switch $SW_1$ is short-circuited with one side fixed terminal $a_1$ thereof, and the vertical synchronizing signal is divided into a half frequency as shown in FIG. 4(B) through a $\frac{1}{2}$ frequency divider 14. The vertical synchronizing signal is then inputted to the multivibrator 15 through the electronic switch $SW_1$. At this moment, since the movable terminal of an electronic switch $SW_2$ is short-circuited with the other side fixed terminal $b_2$, the time constant $T_3$ of a time constant circuit 16 is set by the values of a resistor $R_5$ and a capacitor $C_2$. That is, since the power of the power source terminal Vcc charges the capacitor $C_2$ through the electronic switch $SW_2$ and the resistor $R_5$ as shown in FIG. 4(C) and at the same time is inputted to the trigger terminal $TG_{15}$ of the multivibrator 15, the pulse signal as shown in FIG. 4(D) is outputted from the output terminal of the multivibrator 15. The output pulse signal is inverted through an inverter $I_1$ as shown in FIG. 4(E), and is inputted to the control signal recording/reproduction head 4, so that the control signal recording/reproduction head 4 traces the video tape 5 and records control signal therein as shown in FIG. 4(F). The control signal is then amplified through an amplifier 18 as shown in FIG. 4(G) and is inputted to the motor control system to be utilized in controlling a rotary head drum.

On the other hand, when recording a data signal on a video tape in which a video signal is recorded while reproducing therefrom, a low level signal is inputted to a recording control signal input terminal RECH in order to short-circuit the movable terminal of the electronic switch $SW_1$ with the other side fixed terminal $b_1$ thereof. A high level signal is inputted to a data recording control signal input terminal DH to short-circuit the electronic switch $SW_3$, and the control signal reproduced in the auxiliary reproduction head 6 as shown in FIG. 5(B) is earlier than that of the control signal recording/reproduction head 4 as shown in FIG. 5(A) by the delay of the predetermined time $T_2$. The control signal reproduced in the auxiliary reproduction head 6 is then amplified through the amplifier 11 and is inputted to the multivibrator 12. At this moment, since the pulse signal as shown in FIG. 5(C) is applied to the trigger terminal $TG_{12}$ of the multivibrator 12, the pulse signal as shown in FIG. 5(D) is outputted from the output terminal of the multivibrator 12. This pulse signal is then inputted to the multivibrator 15 through the electronic switch $SW_1$.

In the above, assuming that the data signals of "1011" are recorded, the data signals are inputted to the control terminal of the electronic switch $SW_2$ via the data signal input terminal DAH as shown in FIG. 5(E). The data recording control signal inputted terminal DH a high level signal is input to short-circuit the electronic switch while the data signals are inputted, as shown in FIG. 5(F). Accordingly, the movable terminal of the electronic switch $SW_2$ can be short-circuited selectively with the fixed terminals $a_2$ and $b_2$ thereof according to the data signals. The time constants $T_5$ and $T_3$ of a time constant circuit 16 are set by means of the values of the resistor $R_4$ and capacitor $C_2$ and of the resistor $R_5$ and capacitor $C_2$. Accordingly the charging pattern of the capacitor as shown in FIG. 5(G) is applied to the trigger signal TG 15 of the multivibrator 15, so that the pulse signal as shown in FIG. 5(H) is outputted. Since the output pulse signal is inverted through the inverter $I_1$ as shown in FIG. 5(I) and is applied to the control signal recording/reproduction head 4 through the electronic switch $SW_3$, the control signal recording/reproduction head 4 records the applied pulse signal on the control track of the video tape 5 as shown in FIG. 5(J). The control signal output from the amplifier 17 is amplified through the amplifier 18 as shown in FIG. 5(K) and is input to the motor control system to control the rotary head drum motor and the like. Further, the control signal recording/reproduction head 4 effects a DC erasing by means of a predetermined voltage $(+V)(-V)$ as shown in FIG. 5(J), and the control signal previously recorded in the video tape 5 can be erased.

As described above in detail, the present invention has an advantage in that it is possible to designate the position of a program on a video tape in which a video signal is recorded because an arbitrary data signal can be recorded in and reproduced from the video tape in which a video signal is recorded.

What is claimed is:

1. A data signal recording/reproduction apparatus for a video cassette recorder, comprising:

first amplifier means for amplifying a control signal reproduced by a control signal recording/reproduction head and for outputting the amplified signal to a motor control system;

auxiliary reproduction head means for tracing a control track of a video tape prior to said control signal recording/reproduction head;

second amplifier means for amplifying the control signal reproduced by said auxiliary reproduction head;

first monostable multivibrator means for converting an output signal of said second amplifier means into a pulse signal;

first time constant circuit means for applying various trigger signals having various time constants which are different from each other according to respective SP, EP and LP modes to said first monostable multivibrator means;

first electronic switch means for selecting either an output signal of said first monostable multivibrator means or a vertical signal divided into a half frequency by a half frequency divider according to a recording control signal;

second monostable multivibrator means for converting the selected signal of said first electronic switch means into a pulse signal;

second time constant circuit for applying trigger signals having different time constants according to a data signal to said second monostable multivibrator means;

third amplifier means for amplifying a signal outputted from said second monostable multivibrator means and inverted by an inverter; and second electronic switch means for selecting either an output signal of said third amplifier according to said recording control signal or a data recording control signal and for applying the selected output signal to said control signal record/reproduction head and third amplifier means.

* * * * *